(12) United States Patent
Noh et al.

(10) Patent No.: US 8,302,624 B2
(45) Date of Patent: Nov. 6, 2012

(54) LINEAR VALVE POSITION MEASURING APPARATUS

(75) Inventors: Byung Hoo Noh, Daejeon (KR); Hee Goo Sim, Daejeon (KR); Sung Dong Jang, Daejeon (KR)

(73) Assignee: RPM Tech Co., Ltd., Daejeon (KR)

( * ) Notice: Subject to any disclaimer, the term of this patent is extended or adjusted under 35 U.S.C. 154(b) by 456 days.

(21) Appl. No.: 12/799,353

(22) Filed: Apr. 22, 2010

(65) Prior Publication Data
US 2010/0276016 A1 Nov. 4, 2010

(30) Foreign Application Priority Data
Apr. 22, 2009 (KR) .................. 10-2009-0035223

(51) Int. Cl.
*E03B 7/07* (2006.01)
*F16K 37/00* (2006.01)
*F17D 3/00* (2006.01)
(52) U.S. Cl. ............... 137/554; 251/129.11; 251/252
(58) Field of Classification Search ................. 137/554; 251/129.11, 251–256
See application file for complete search history.

(56) References Cited

U.S. PATENT DOCUMENTS

| 4,570,903 | A | | 2/1986 | Crass |
| 4,621,250 | A | * | 11/1986 | Echasseriau et al. ......... 338/162 |
| 4,884,720 | A | | 12/1989 | Whigham et al. |
| 5,011,043 | A | | 4/1991 | Whigham et al. |
| 5,134,923 | A | * | 8/1992 | Wexler .............................. 92/31 |
| 5,137,257 | A | * | 8/1992 | Tice ........................ 251/129.11 |
| 5,469,737 | A | | 11/1995 | Smith et al. |

\* cited by examiner

*Primary Examiner* — Eric Keasel
*Assistant Examiner* — Seth Faulb
(74) *Attorney, Agent, or Firm* — Rabin & Berdo, P.C.

(57) ABSTRACT

There is provided an apparatus for measuring a position of a linear type valve which is open/shut by operation of a hydraulic cylinder. More particularly, the apparatus more accurately measures a valve position by outputting a rotation angle of a rotation sleeve which rotates by being operatively connected to a hydraulic cylinder which moves linearly, and by calculating a vertical movement distance of a valve gate which changes in proportion to the rotation angle. Further, since the structure of the apparatus is very simple, the cost of production is significantly reduced. In addition, for use, the apparatus is installed on the hydraulic cylinder by a simple method.

5 Claims, 7 Drawing Sheets

LINEAR VALVE POSITION MEASURING APPARATUS

CROSS-REFERENCE TO RELATED PATENT APPLICATION

This application claims the benefit of Korean Patent Application No. 10-2009-0035223, filed on Apr. 22, 2009, in the Korean Intellectual Property Office, the disclosure of which is incorporated herein in its entirety by reference.

TECHNICAL FIELD

The present invention relates to a linear valve position measuring apparatus which is installed at a hydraulic cylinder to operate opening/shutting of various linear type valves, and more particularly, to a linear valve position measuring apparatus, whereby a valve position is measured by calculating a vertical movement distance of a valve gate which varies in proportion to a rotation angle of a rotation sleeve, to significantly improve the accuracy of valve position measurement and simplify the structure of the apparatus.

BACKGROUND

In general, various linear type valves are installed to be connected to valve switches. As a valve switch operates, a valve gate moves vertically to open/shut a path of flow of a fluid.

A linear type valve operates at the same time when a valve switch operates. Valve position measuring apparatuses are various. Preferably, a valve position measuring apparatus may be installed to be connected to a valve, to control a valve position based on a value of the valve position as measured.

An absolute majority of conventional valve position measuring apparatuses are structured to be connected to only a valve with a switch to move a valve gate vertically by operation of an electric motor. Therefore, most conventional valve position measuring apparatuses are limited in use.

That is, a conventional valve position measuring apparatus is installed to be connected to a rotary shaft of an electric motor. The valve position measuring apparatus measures the rotation number of the electric motor when a valve is open or shut, calculates a value of a valve position based on the rotation number of the electric motor, and indicates the value on a display.

Therefore, the conventional valve position measuring apparatus cannot be used in any other valves in which a valve gate moves vertically by operation of a hydraulic cylinder than the valve with a valve switch and an electric motor.

These days, a method for measuring a valve position by using a linear potentiometer has been suggested. The linear potentiometer is installed on a hydraulic cylinder. In this method, a valve position is measured based on a vertical movement distance of a piston rod which moves vertically in the hydraulic cylinder. The vertical movement distance of the piston rod is measured by the linear potentiometer. However, since the linear potentiometer is very expensive, the cost of production is high. Moreover, the work of installing the linear potentiometer is very complicated. In addition, since the linear potentiometer occupies considerable space, the volume of a valve position measuring apparatus is large.

Therefore, the present invention has been made to solve the aforementioned problems of a conventional valve position measuring apparatus, and to provide a linear valve position measuring apparatus, whereby a valve actual position is measured by measuring a rotation angle of a rotation sleeve which forwardly/reversibly rotates, depending on a vertical movement of a piston rod, and by calculating a movement distance of the piston rod (i.e., a movement distance of a valve gate) which changes in proportion to the rotation angle.

In accordance with an aspect of the present invention, there is provided a technique of measuring a valve position, by installing a rotation sleeve so as to be rotatable on a hydraulic cylinder, the rotation sleeve surrounding the outside of a piston rod; connecting a guide pin so as to protrude outwardly through a spiral groove formed on the rotation sleeve, the guide pin installed at an upper part of the piston rod; and installing a potentiometer at a top end of the rotation sleeve, the potentiometer outputting an electrical signal corresponding to a rotation angle of the rotation sleeve, wherein an electronic control unit (ECU) calculates a vertical movement distance of the piston rod by using the electrical signal of the potentiometer.

In accordance with another aspect of the present invention, there is provided a technique of preventing the guide pin from rotating when the piston rod moves vertically, by positioning the guide pin between a pair of supporting poles which are vertically installed.

In accordance with another aspect of the present invention, there is provided a technique of fitting a rod cap connected to a top end of the piston rod into a pin holder where the guide pin is installed, so that the rod cap freely rotates in the pin holder.

In accordance with the present invention, the potentiometer outputs the electrical signal corresponding to the rotation angle of the rotation sleeve which is operatively connected to the piston rod moving vertically and rotates, and the ECU calculates the vertical movement distance of the piston rod, thereby providing the effect of accurately measuring a valve actual position.

Consequently, the valve position is accurately measured by a simple method. Further, the structure of the valve position measuring apparatus is simplified. In addition, since an inexpensive component (potentiometer) is used, the cost is significantly reduced. Furthermore, since the linear valve position measuring apparatus is easily installed on the hydraulic cylinder, the work of installing the apparatus and the convenience are improved.

DESCRIPTION OF THE DRAWINGS

These and other aspects and advantages of the present invention will become apparent and more readily appreciated from the following description of the embodiments, taken in conjunction with the accompanying drawings, in which.

BRIEF DESCRIPTION OF REFERENCE NUMBERS OF MAJOR ELEMENTS

Figure 1:
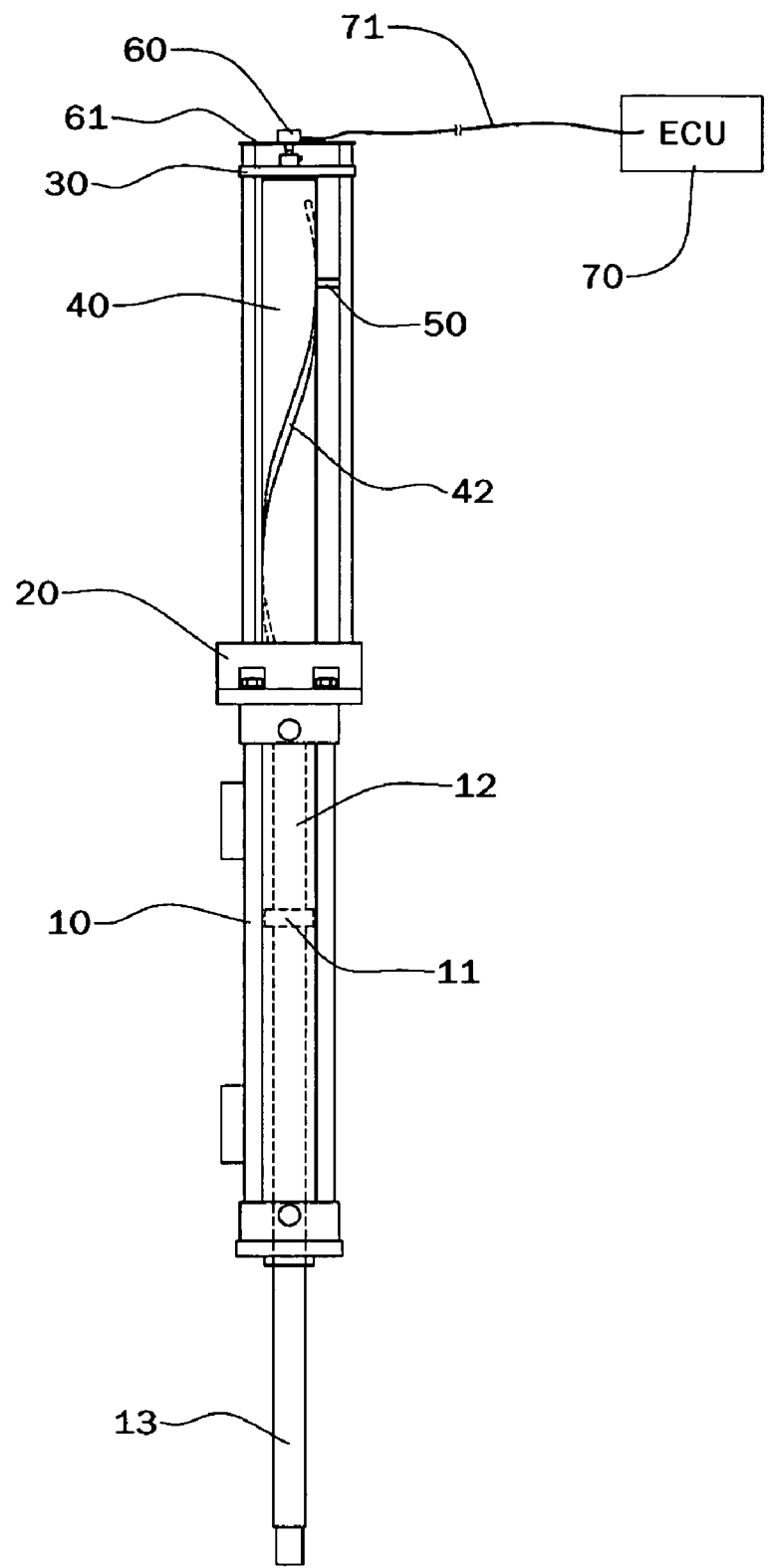
FIG. 1 is a front view illustrating a linear valve position measuring apparatus according to the present invention, which is installed at a bidirectional hydraulic cylinder.
Figure 2:
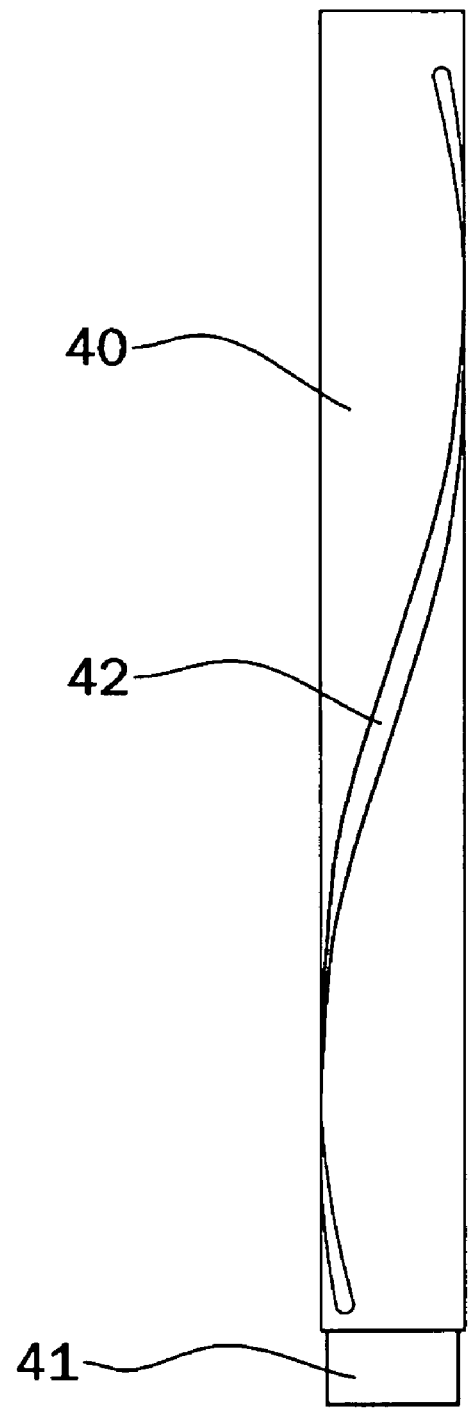
FIG. 2 is a front view illustrating a rotation sleeve according to the present invention.

| 10: | bidirectional hydraulic cylinder | 12: | upper piston rod |
| 20: | rotation supporting housing | 30: | top supporting plate |
| 31, 32: | supporting poles | 40: | rotation sleeve |
| 42: | spiral groove | 44: | sleeve cap |
| 50: | guide pin | 52: | pin holder |
| 55: | rod cap | 60: | potentiometer |
| 63: | variable shaft | 70: | ECU |

DETAILED DESCRIPTION

In accordance with a preferred embodiment of the present invention, the above and other aspects can be accomplished by a linear valve position measuring apparatus comprising: a rotation supporting housing 20 installed on a bidirectional hydraulic cylinder 10; a top supporting plate 30 positioned above, spaced apart from and assembled with the rotation supporting housing 20 in a single body by a plurality of supporting poles 31 and 32; a rotation sleeve 40 positioned to surround the outside of an upper piston rod 12 of the bidirectional hydraulic cylinder 10, top and bottom ends of the rotation sleeve 40 being rotatably connected to the rotation supporting housing 20 and the top supporting plate 30, respectively, and the outer circumference of the rotation sleeve 40 including a spiral groove 42 formed to pass through the inside and outside of the rotation sleeve 40; a guide pin 50 with one end being connected to an upper part of the upper piston rod 12 and the other end protruding outwardly through the spiral groove 42; a potentiometer 60 installed through a potentiometer securing plate 61 connected to the top supporting plate 30, and a variable shaft 63 positioned below the potentiometer 60 and connected to the rotation sleeve 40 in a single body, to output an electrical signal corresponding to a rotation angle of the rotation sleeve 40; and an electronic control unit (ECU) 70 to calculate a vertical movement distance of the upper piston rod 12 by using the electrical signal being output by the potentiometer 60.

Hereinafter, embodiments of the present invention will be described in detail with reference to the accompanying drawings.

The present invention provides a linear valve position measuring apparatus which is easily and dedicatedly installed on a bidirectional hydraulic cylinder 10 to directly move a linear type valve vertically, whereby a valve position is measured. The bidirectional hydraulic cylinder 10 is open to enable vertical movement of a pair of an upper piston rod 12 and a lower piston rod 13 respectively installed at upper and lower positions of a piston 11 in a single body.

A gate of the valve is connected to the lower piston rod 13 to directly raise the gate or move it down. The upper piston rod 12 moves vertically, driving a rotation sleeve 40 to rotate forwardly/reversibly. Accordingly, it is possible to measure a vertical movement distance of the upper piston rod 12 which changes in proportion to a rotation angle of the rotation sleeve 40.

A rotation supporting housing 20 is installed on the bidirectional hydraulic cylinder 10, by passing through the upper piston rod 12 and it supports a lower part of the rotation sleeve 40 so as to be rotatable.

Figure 3:
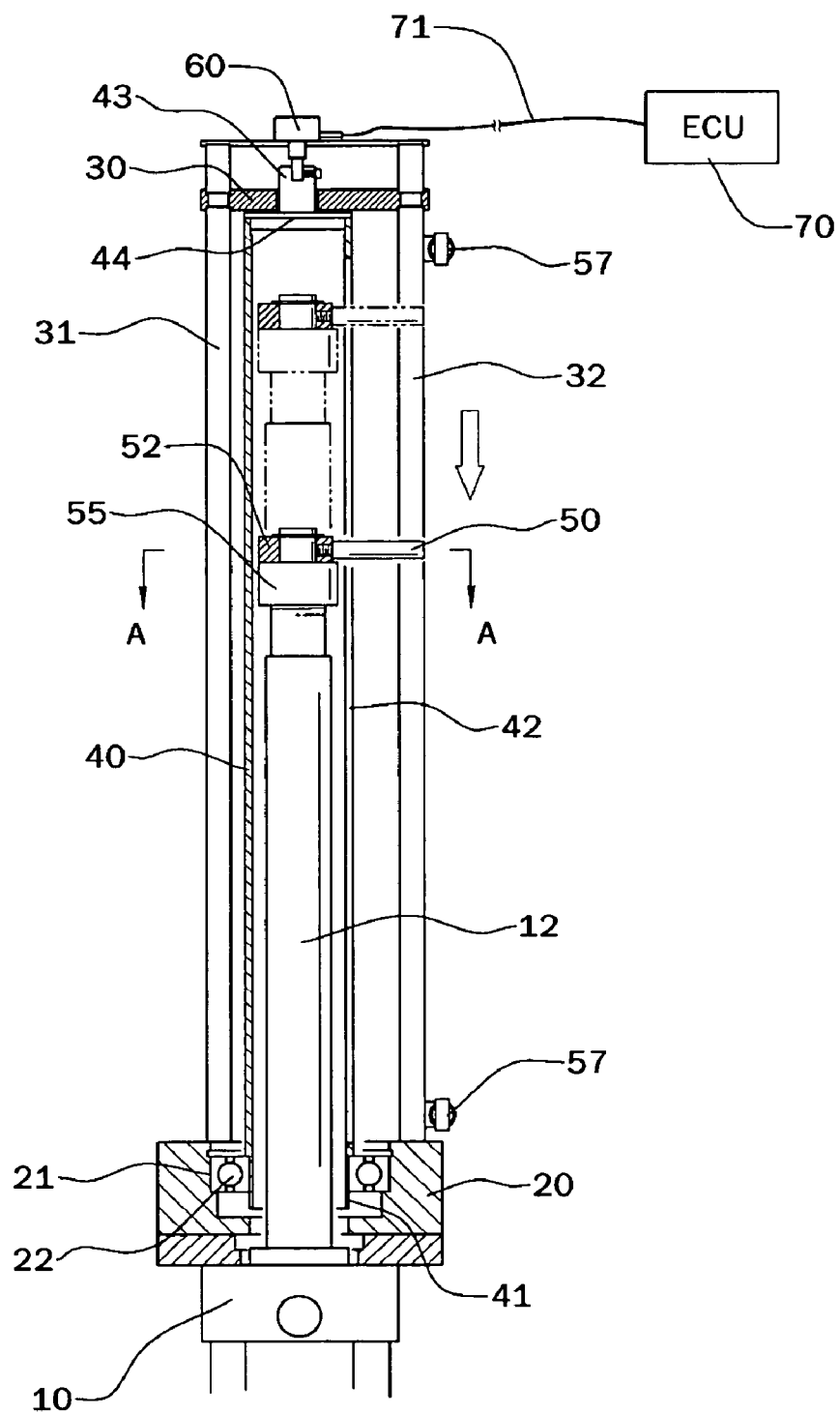
FIG. 3 is a longitudinal sectional view illustrating the operation of the valve position measuring apparatus.

As illustrated in FIG. 3, the rotation supporting housing 20 includes a bearing 22 and a bearing receiving opening 21. The bearing 22 is fitted into the bearing receiving opening 21, and a rotation end 41 formed at a bottom of the rotation sleeve 40 is fitted into the bearing 22, thereby enabling smooth rotation operation of the rotation sleeve 40.

Figure 10:
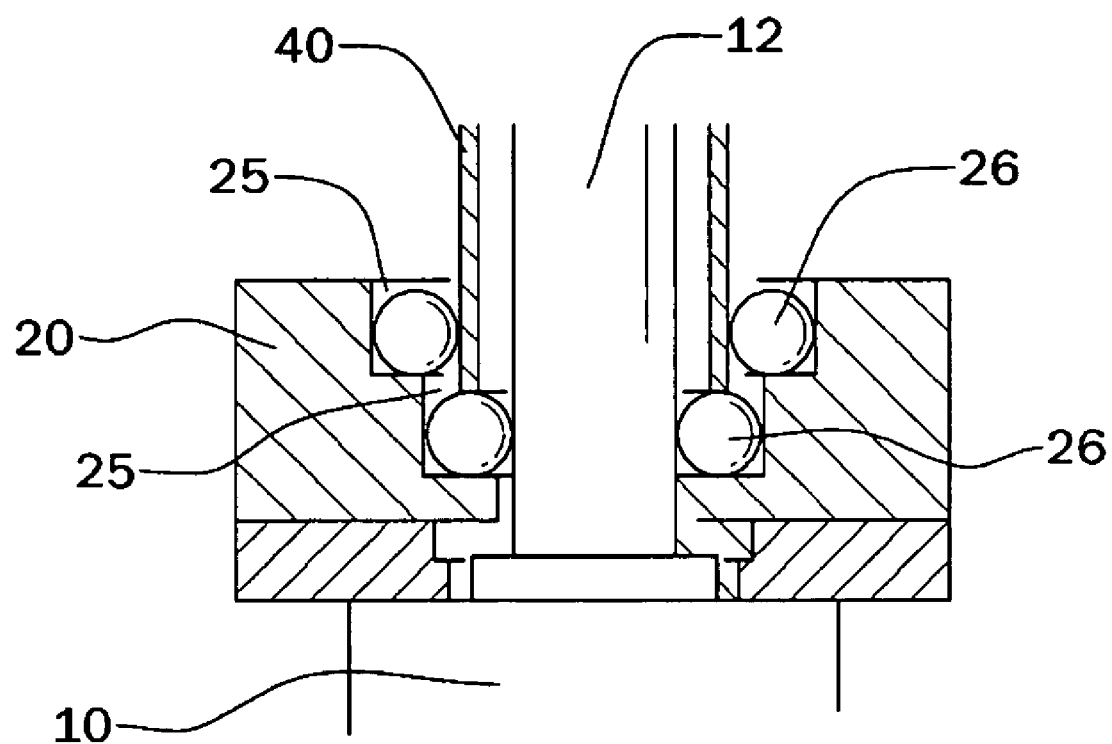
FIG. 10 is a longitudinal sectional view illustrating the rotation sleeve which is rotatably supported by using rotation balls installed in a rotation supporting housing according to the present invention.

Further, as illustrated in FIG. 10, the rotation supporting housing 20 may include a rotation ball receiving opening 25 formed in a multiple step manner, to support the smooth rotation of the rotation sleeve 40, without using any expensive bearings as the components. Rotation balls 26 are received in the rotation ball receiving opening 25. The rotation balls 26 support a lower end of the rotation sleeve 40 and are secured to the outer circumference of a lower part of the rotation sleeve 40, thereby frictionally supporting and enabling rotation of the rotation sleeve 40. This structure reduces the cost.

A top supporting plate 30 is positioned to be spaced apart from the rotation supporting housing 20. The top supporting plate 30 and the rotation supporting housing 20 are connected to each other in a single body by a plurality of supporting poles 31 and 32, so that the top supporting plate 30 and the rotation supporting housing 20 are maintained in a firm assembly state.

The rotation sleeve 40 is positioned to surround the outside of the upper piston rod 12. A spiral groove 42 in a spiral shape is formed on the outer circumference of the rotation sleeve 40. The spiral groove 42 is formed to pass through the inside and outside of the rotation sleeve 40.

A sleeve cap 44 with a rotation protrusion 43 is fitted into an upper part of the rotation sleeve 40 in a single body. A rotation bushing 45 is received around the outside of the rotation protrusion 43. The rotation protrusion 43 with the rotation bushing 45 passes through the top supporting plate 30, so as to be rotatably connected together. The lower part of the rotation sleeve 40 is rotatably connected to the rotation supporting housing 20.

The spiral groove 42 provides a path through which a guide pin 50 connected to the upper piston rod 12 moves vertically. While the guide pin 50 moves, it pushes vertically the inside of the spiral groove 42, so that the rotation sleeve 40 can rotate forwardly/reversibly. Upper and lower ends of the spiral groove 42 are positioned at different angles in a view from the position of a horizontal plane of the spiral groove 42. The angle range corresponds to the maximum rotation angle range of the rotation sleeve 40.

Figure 4:
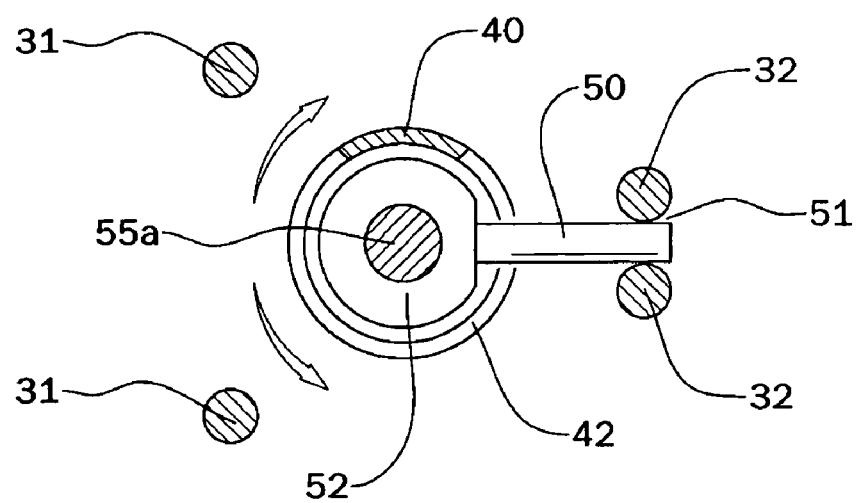
FIG. 4 is a sectional view illustrating the valve position measuring apparatus, taken along Line A-A shown in FIG. 3.

One end of the guide pin 50 is connected to an upper part of the upper piston rod 12 and the other end of the guide pin 50 passes through the spiral groove 42 and protrudes outwardly. Then, the guide pin 50 is positioned to pass through a guide space 51 formed between a pair of the supporting poles 32 which are positioned to be adjacent to each other as illustrated in FIG. 4, thereby preventing any rotation movement caused by resistance generating when the guide pin 50 pushes the inside of the spiral groove 42 during it moves vertically as the upper piston rod 12 moves. Therefore, in any cases, the guide pin 50 is prevented from rotating, so that it smoothly moves vertically.

Figure 5:
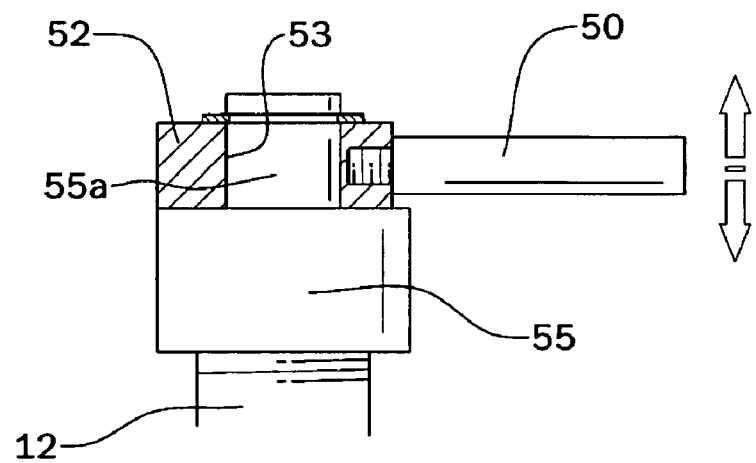
FIG. 5 is a longitudinal sectional view illustrating the connection of a piston rod, a rod cap and a pin holder according to the present invention.
Figure 6:
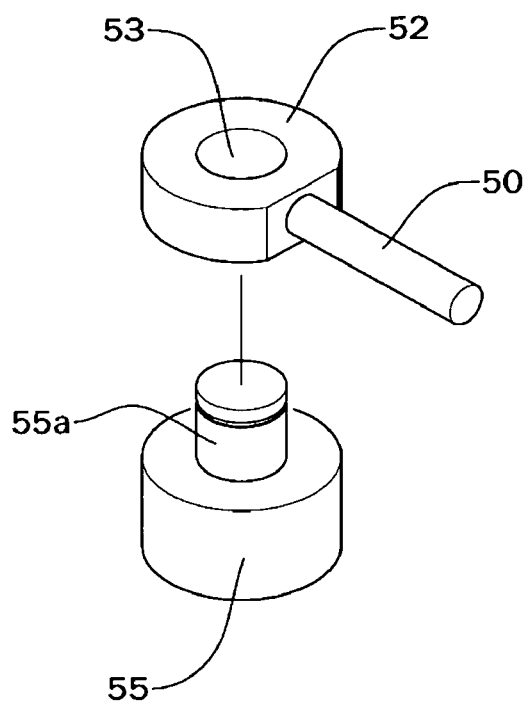
FIG. 6 is a dissembled perspective view illustrating the rod cap and the pin holder.

The guide pin 50 may be directly installed at a rod cap 55 connected to the top end of the upper piston rod 12 in a single body. Otherwise, the guide pin 50 may be installed at one side of a pin holder 52 connected to the rod cap 55, as illustrated in FIGS. 5 and 6.

However, when the guide pin 50 is installed at the pin holder 52, a connection protrusion 55a is freely rotatably fitted into and connected to a rotation opening 53 formed at the pin holder 52.

A piston ring fitted to be received around the outside of the general piston 11 is secured to be movable, along the inside of the cylinder. Thus, even though any rotation movement occurs during the piston 11 and the upper piston rod 12 move vertically, the rotation force is not transferred to the pin holder 52, so that only the upper piston rod 12 can move to rotate.

Therefore, since the rotation force of the upper piston rod 12 is prevented from being transferred to the guide pin 50 in any case, the guide pin 50 provides the effect of driving the rotation sleeve 40 to smoothly rotate.

Figure 7:
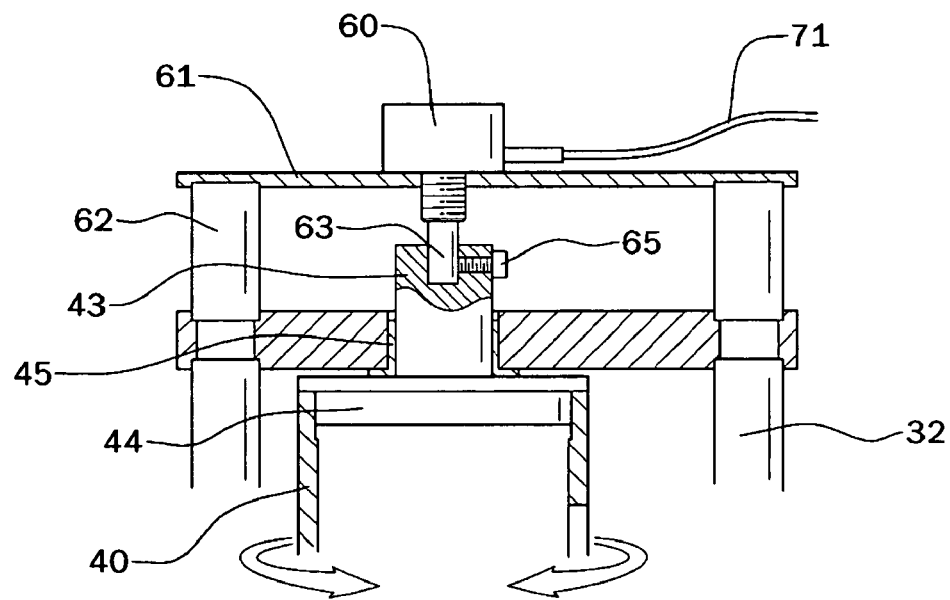
FIG. 7 is an enlarged sectional view illustrating a sleeve cap, an upper supporting plate and a potentiometer according to the present invention, which are installed.

In accordance with the present invention, as illustrated in FIG. 7, a potentiometer securing plate 61 is spaced apart from and connected to a top side of the upper supporting plate 30 in a single body, by a plurality of space bars 62. A potentiometer 60 is installed through the potentiometer securing plate 61. A variable shaft 63 formed under the potentiometer 60 is connected to the rotation sleeve 40 in a single body, so that while the variable shaft 63 and the rotation sleeve 40 are operatively connected to each other and rotate, the potentiometer 60 outputs an electrical signal corresponding to a rotation angle of the rotation sleeve 40.

Figure 8:
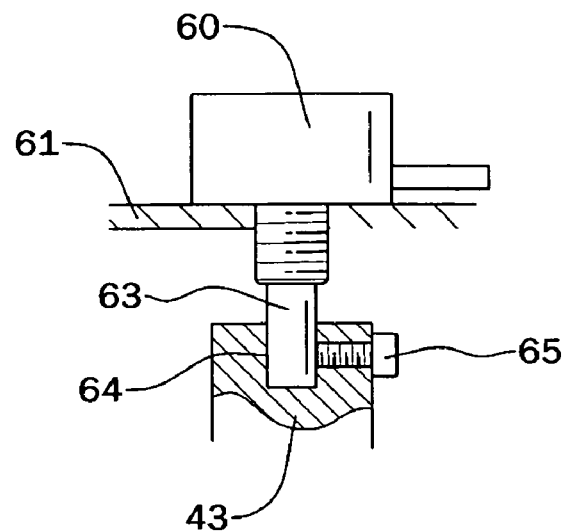
FIG. 8 is a longitudinal sectional view illustrating the sleeve cap and the potentiometer which are assembled according to an embodiment.
Figure 9:
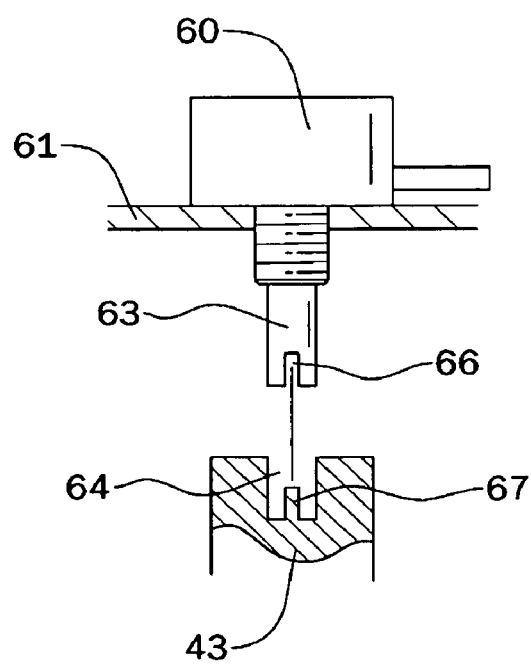
FIG. 9 is a longitudinal sectional view illustrating the sleeve cap and the potentiometer which are assembled according to another embodiment.

As illustrated in FIG. 8, when the variable shaft 63 is inserted into a shaft receiving opening 64 formed in the sleeve cap 44, the potentiometer 60 is secured by a securing member 65 connected to the variable shaft 63 by a screw, through the outside of the sleeve cap 44. However, the present invention does not limit thereto. As illustrated in FIG. 9, the variable shaft 63 is inserted into the shaft receiving opening 64 but a rotation preventing groove 66 is formed at a bottom of the variable shaft 63. Then, a rotation preventing protrusion 67 formed to protrude from a bottom of the shaft receiving opening 64 is fitted into the rotation preventing groove 66, so as to be connected together. Therefore, the variable shaft 63 is operatively connected to the rotation sleeve 40, to rotate together.

The potentiometer 60 is connected to an electronic control unit (ECU) 70 by a transmission line 71. The ECU 70 calculates a vertical movement distance of the upper piston rod 12 corresponding to the rotation angle of the potentiometer 60, by using the electrical signal being output by the potentiometer 60, so that the valve position is accurately measured. A measurement value of the valve position is indicated on a display unit included in a control panel, to be easily confirmed by an operator.

Further, the present invention applies methods of limiting the vertical movement of the upper piston rod 12 and the guide pin 50. As one method thereof, when the minimum and maximum rotation angle values of the rotation sleeve 40 are predetermined and the actual rotation angle values of the rotation sleeve 40 reach to the predetermined values, the movement of the upper piston rod 12 and the guide pin 50 are automatically limited by signals. As the other method thereof, when the guide pin 50 is in contact with limit switches 57 respectively installed adjacently to upper and lower sides of the spiral groove 42 as illustrated in FIG. 3, the movement of the guide pin 50 is mechanically limited.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A linear valve position measuring apparatus comprising:
   a rotation supporting housing (20) installed on a bidirectional hydraulic cylinder (10);
   a top supporting plate (30) positioned above, spaced apart from and assembled with the rotation supporting housing (20) in a single body by a plurality of supporting poles (31, 32);
   a rotation sleeve (40) positioned to surround the outside of an upper piston rod (12) of the bidirectional hydraulic cylinder (10), top and bottom ends of the rotation sleeve (40) being respectively rotatably connected to the rotation supporting housing (20) and the top supporting plate (30), and the outer circumference of the rotation sleeve (40) including a spiral groove (42) formed to pass through the inside and outside of the rotation sleeve (40);
   a guide pin (50) with one end being connected to an upper part of the upper piston rod (12) and the other end passing through the spiral groove (42) and protruding outwardly, the guide pin (50) positioned to pass through a guide space (51) formed between a pair of the supporting poles (32) installed to be adjacent to each other, to prevent a rotation movement upon a vertical movement;
   a potentiometer (60) installed through a potentiometer securing plate (61) connected to the top supporting plate (30), and a variable shaft (63) positioned under the potentiometer (60) and connected to the rotation sleeve (40) in a single body, to output an electrical signal corresponding to a rotation angle of the rotation sleeve (40); and
   an ECU (electronic control unit) (70) to calculate a vertical movement distance of the upper piston rod (12), by using the electrical signal being output by the potentiometer (60).

2. The apparatus according to claim 1, wherein the guide pin (50) is installed at one side of a pin holder (52) in which a rotation opening (53) is formed, and a connection protrusion (55a) of a rod cap (55) connected to a top end of the rotation sleeve (40) in a single body is freely rotatably fitted into and connected to the rotation opening (53).

3. The apparatus according to claim 1, wherein the rotation supporting housing (20) includes a bearing receiving opening (21) and a bearing (22) to be fitted into the bearing receiving opening (21), and a rotation end (41) formed at a bottom of the rotation sleeve (40) is fitted into the bearing (22).

4. The apparatus according to claim 1, wherein the rotation supporting housing (20) includes a rotation ball receiving opening (25) formed in a multiple step manner, and rotation balls (26) to be received in the rotation ball receiving opening (25), the rotation balls (26) frictionally support a lower end and the outer circumference of a lower part of the rotation sleeve (40) so as to be rotatable.

5. The apparatus according to claim 1, wherein the potentiometer (60) includes a variable shaft (63) formed under the potentiometer (60), the variable shaft (63) is inserted into a shaft receiving opening (64) formed in a sleeve cap (44) and is secured by a securing member (65) connected thereto by a screw through the outside of the sleeve cap (44), or the variable shaft (63) is inserted into the shaft receiving opening (64) and is secured by fitting/connecting a rotation preventing protrusion 67 formed to protrude from a bottom of the shaft receiving opening (64) into/to a rotation preventing groove (66) formed at a bottom of the variable shaft (63).

* * * * *